Patented Nov. 11, 1941

2,262,244

UNITED STATES PATENT OFFICE

2,262,244

STEROL DERIVATIVES AND METHOD OF PREPARING SAME

Russell Earl Marker, State College, Pa., assignor to Parke, Davis & Company, Detroit, Mich., a corporation of Michigan No Drawing. Application December 23, 1937, Serial No. 181,394

10 Claims. (Cl. 260—397.2)

The invention relates to a new class of organic compounds which may be considered as ring-saturated, side-chain unsaturated sterols.

Sterols are neutral substances occurring regularly in animal and plant fats and oils and are of great physiological significance as well as being valuable intermediates for the preparation of many useful compounds including hormones, vitamins and the like. Most of the known sterols contain carbon-to-carbon double-bonds, unsaturated linkages, either in the cyclopentano phenanthrene ring system alone or in both the ring system and in the hydrocarbon side-chain attached to this ring system. The only exceptions are a few sterols, such as coprosterol and dihydrocholesterol, which are completely saturated and contain no double-bonds in either the ring system or the side-chain. The new compounds of this invention differ from the known sterols in that they contain a double-bond in the hydrocarbon side-chain but not in the ring system.

The new compounds of the invention have the general formula,

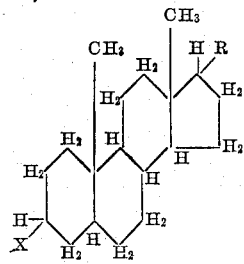

where R represents a hydrocarbon side-chain containing at least one double-bond, and X indicates OH, or a group which upon hydrolysis is converted into a hydroxyl group, such as O-acyl, O-alkyl, O-aryl or halogen.

The new compounds may be obtained by partially reducing a compound of the formula

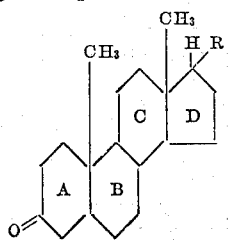

where R is a hydrocarbon side-chain containing at least one double-bond, and the ring system A, B, C and D is saturated, with the exception of one or more double-bonds capable of hydrogenation under conditions which do not cause simultaneous complete saturation of the double-bonds of the side-chain.

Although the double-bonds to be reduced in the ring system may occupy any position with regard to the 3-keto group shown in the formula for the ketone intermediate, it is preferred that intermediates be used having unsaturation between the first and second carbon atoms around the ring away from the carbon atom to which the ketonic oxygen is attached. That is, the preferred method is to make use of $\alpha$-$\beta$-unsaturated ketonic derivatives of sterols in the partial reduction and ring saturation to give the new side-chain unsaturated sterol compounds.

The invention will be more easily understood by reference to the following examples.

EXAMPLE 1

In this example, a method is given for preparing the stigmastenone to be used in Example 2 below. A mixture of 10 grams of stigmasterol and 12 grams of precipitated copper is heated in a retort to 180–200° C. at 2 mm. pressure for 30 minutes. The temperature is then raised to 250–275° C. in order to distil the reaction product. The distillate is collected and crystallized from acetone, methanol and alcohol to give stigmastenone having a melting-point of 94° C.

Anal. calcd. for $C_{29}H_{46}O$: C, 84.8; H, 11.3. Found: C, 84.3; H, 11.6.

EXAMPLE 2

Ten grams of sodium are added in small pieces to a boiling solution of 2 grams of stigmastenone in 100 cc. of dry amyl alcohol. The solution of the reactants is refluxed for 30 minutes after the sodium has dissolved. Water is then added and the amyl alcohol layer separated and distilled under reduced pressure. The residue from the distillation is heated on the steam bath for one hour with 5 grams of succinic anhydride and 10 cc. of pyridine. The mixture is thereafter cooled, diluted with ether, then washed with dilute hydrochloric acid and then with sodium carbonate solution to remove the half succinic ester. The sodium carbonate extract containing the half succinic acid ester of the reduced stigmastenone is acidified with hydrochloric acid and extracted with ether. The ether is distilled off of the ether layer and the residue hydrolyzed by warming it with alcoholic potassium hydroxide solution. The solution obtained from the hydrolysis is diluted with water, extracted with ether, and the ether evaporated from the ethereal extract. The residue from evaporating off the ether is taken up and crystallized from alcohol to give 5,6-dihydrostigmasterol having a melting-point of 187° C. The 5,6-dihydrostigmasterol forms an insoluble digitonide with digitonin. It is represented by the formula,

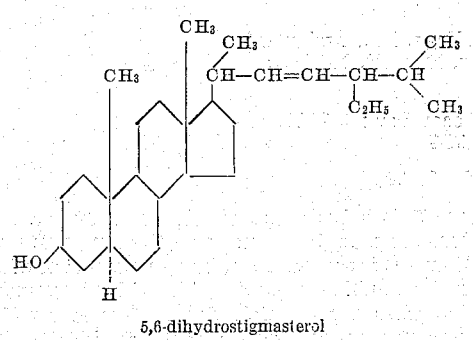

5,6-dihydrostigmasterol

EXAMPLE 3

5,6-dihydrostigmasteryl acetate melting at 122° C. and analyzing practically the theoretical amount of carbon and hydrogen for $C_{31}H_{52}O_2$ is obtained by acetylating 5,6-dihydrostigmasterol. For example, 100 mg. of 5,6-dihydrostigmasterol in 10 cc. of acetic anhydride is refluxed for 30 minutes. After removing the excess acetic anhydride by distillation, the residue is crystallized from methanol and alcohol to give 5,6-dihydrostigmasteryl acetate.

5,6-dihydrostigmasteryl acetate gives a dibromide when treated with bromine in acetic acid, thus showing that the double-bond in the side-chain of the stigmastenone is not saturated during the reduction in Example 2.

As further proof that the 5,6-dihydrostigmasterol compound obtained in Example 2 has a saturated ring system and contains one double-bond in the side-chain, I have found that stigmastanol and sitostanol are identical. This has been done by catalytically hydrogenating the 5,6-dihydrostigmasterol of Example 2 to obtain stigmastanol which I have found to be identical with the known compound, sitostanol, obtained by catalytically hydrogenating the acetate of sitosterol and then hydrolyzing. Hence, if the compound of Example 2 had been hydrogenated in the open hydrocarbon chain instead of in the ring system, sitosterol would have resulted. Such was not the case, however, since sitosterol melts at 146° C. whereas the dihydro product of Example 2 has a melting-point of 187° C.

This identity of stigmastanol with sitostanol is further borne out by catalytic reduction of sitostenone and also of the stigmastenone of Example 1 to obtain in each instance the new compound, 24-ethyl epi-coprostanol. The relationship mentioned between the stigmasterol and sitosterol series is made clear by the following examples.

EXAMPLE 4.—*Preparation of sitostanol from 5,6-dihydrostigmasterol*

A solution of 100 mg. of 5,6-dihydrostigmasteryl acetate, obtained as described in Example 2 above dissolved in 25 cc. of acetic acid, is shaken with 100 mg. of platinum oxide catalyst in a hydrogen atmosphere at 45 pounds (3 atmospheres) pressure. The catalyst is filtered off and the acetic acid distilled from the filtrate under reduced pressure. The residue is crystallized from methanol and alcohol to give the known compound, sitostyl acetate, melting at 136° C. This product gives no depression in melting-point when mixed with authentic stigmastyl acetate obtained by the catalytic reduction of stigmasteryl acetate, thus conclusively showing that sitostanol and stigmastanol are identical compounds.

Anal. calcd. for $C_{31}H_{54}O_2$ (stigmastyl acetate): C, 81.2; H, 11.8. Found: C, 81.6; H, 12.0.

When the sitostyl acetate (stigmastyl acetate) of this example is hydrolized with alcoholic potassium hydroxide, it gives a product which, after crystallizing from alcohol, melts at 139° C. The hydrolyzed product shows no depression in melting-point when mixed with stigmastanol, prepared by the hydrogenation and subsequent hydrolysis of stigmasteryl acetate.

Example 5 below shows preparation of 24-ethyl epi-coprostanol from stigmastenone and also from sitostenone by the same method, thus demonstrating the relationships between the compounds of the stigmasterol, sitosterol and coprosterol series and providing further confirmation of the fact that the compound of Example 2 is a ring-saturated, side-chain unsaturated sterol.

EXAMPLE 5.—*24-ethyl epi-coprostanol from sitostenone*

A solution of 5 grams of sitostenone in 200 cc. of ether is shaken with 0.5 gram of platinum oxide catalyst in a hydrogen atmosphere at 45 pounds (3 atmospheres) pressure for 4 hours. After filtering the ethereal solution, the ether is distilled off and the residue refluxed for 9 hours with 5 grams of sodium and 250 cc. of xylene. The treatment with sodium and xylene serves to convert small amounts of allo compounds present almost completely into their 3-beta-hydroxy forms, which are then removed by precipitation with digitonin and filtering off the precipitate. This is done by adding alcohol and water to the reaction mixture, separating the xylene layer and evaporating it under reduced pressure. To the residue, dissolved in one liter of boiling alcohol there is added a solution of 10 grams of digitonin in 500 cc. of alcohol. After standing overnight the digitonides are filtered off. The filtrate is evaporated to dryness and the sterol extracted from the excess digitonin with ether. The ether is evaporated and the residue crystallized from methanol and alcohol to give 24-ethyl epi-coprostanol melting at 137° C.

Anal. calcd. for $C_{29}H_{52}O$: C, 83.3; H, 12.6. Found: C, 83.8; H, 12.8.

A solution of 100 mg. of 24-ethyl epi-coprostanol in 5 cc. of acetic anhydride is refluxed 30 minutes. After evaporating the excess acetic anhydride the residue, 24-ethyl epi-coprostyl acetate, is crystallized from methanol. The acetate melts at 94° C.

Anal. calcd. for $C_{31}H_{54}O_2$: C, 81.2; H, 11.8. Found: C, 81.5; H, 11.9.

EXAMPLE 6.—*24-ethyl epi-coprostanol from stigmastenone*

A solution of 5 grams of stigmastenone in 200 cc. of ether is shaken with 0.5 gram of platinum oxide catalyst in a hydrogen atmosphere at 45 pounds (3 atmospheres) pressure for 3 hours. After filtering the ethereal solution, and evaporating the ether, the residue is treated with sodium and boiling xylene. The insoluble digitonides are then removed as described in Example 5 for the preparation of 24-ethyl epi-coprostanol from sitostenone. The solution obtained from filtering off the digitonides is evaporated to dryness and the sterol extracted from excess digitonin with ether. The ether solution is evaporated and the residue crystallized from methanol and alcohol to give 24-ethyl epi-coprostanol melting at 137° C. It shows no depression in melting-point when mixed with the 24-ethyl epi-coprostanol from sitostenone as given in Example 5. Substantially the theoretical amounts of carbon and hydrogen for $C_{21}H_{52}O$ are obtained upon analysis.

The acetate of the compound of this example is obtained by acetylation and shows a melting-point of 94° C. It gives no depression in melting-point when mixed with 24-ethyl epi-coprostyl acetate from sitostenone.

In preparing the new compounds of the invention, any 3-keto sterol derivatives, such as the 3-keto derivative of stigmasterol, ergosterol, fucosterol, etc. under the above general ketone formula, having at least one carbon-to-carbon double-bond in the ring system and at least one in the open hydrocarbon side-chain may be reduced as described.

Any of the known methods may be employed for converting the 3-hydroxy compounds first obtained from the ketones into their equivalent derivatives capable upon hydrolysis of being converted into the corresponding hydroxylated compounds, such as sterol derivatives containing O—acyl, O—alkyl, O—aryl or halogen at the 3-position. For example, the 5,6-dihydrostigmasterol of Example 2 can be treated by any other suitable organic acid anhydride, other than acetic anhydride, or with a carboxylic acid halide for converting the 3-hydroxyl into the group —O—acyl. Also, the hydroxy compounds of the invention can have the hydroxyl replaced by halogen through the use of any known halogenating agents, such as phosphorus halide, thionyl halides like thionyl chloride, etc. The alkyl or aryl ethers wherein the hydroxyl is replaced by —O—alkyl or —O—aryl are obtained by the usual methods for ether formation, such as reacting the hydroxy-sterol compound with another alcohol in presence of sulfuric acid, or converting it with alkali metal to an alkylate and then reacting with a halogenated hydrocarbon or alkyl halide. When the 3-hydroxyl is to be replaced by —O—aryl, it is possible to react a phenol compound and caustic alkali with the sterol derivative having its 3-hydroxyl replaced by halogen or by an equivalent acid radical, such as the sulfate radical.

Numerous reducing agents may be used, but the most satisfactory are those providing nascent hydrogen, especially combinations of alkali metal with aliphatic alcohol.

What I claim as my invention is:

1. Process for the preparation of ring-saturated, side-chain unsaturated hydroxy steroids which comprises reducing with nascent hydrogen a compound having the molecular structure,

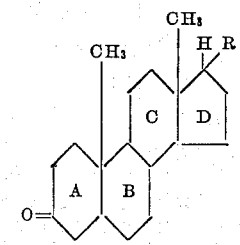

where R is a hydrocarbon side-chain containing at least one double-bond, and the ring system contains an $\alpha$-$\beta$-unsaturated ketone grouping and contains no other type of unsaturation in the ring system.

2. Process for the preparation of ring-saturated, side-chain unsaturated sterol compounds which comprises reducing a compound of the formula,

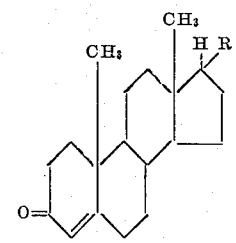

where R is a hydrocarbon side-chain containing a double-bond, with nascent hydrogen.

3. Process for the preparation of ring-saturated, side-chain unsaturated sterol compounds which comprises reducing a compound of the formula,

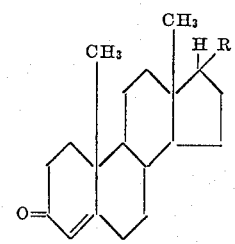

where R is a hydrocarbon side-chain containing a double-bond, with nascent hydrogen obtained by reaction of an alkali metal and an aliphatic alcohol.

4. Process for the preparation of 5,6-dihydrostigmasterol which comprises partially reducing stigmastenone with a nascent hydrogen reducing agent which does not saturate the double-bond in the side-chain of stigmastenone.

5. Ring-saturated side-chain unsaturated hydroxy steroids, the side chain containing the same number of carbon atoms as are present in the naturally occurring sterols.

6. 5,6-dihydrostigmasterol.

7. Stigmastenone.

8. Process for the preparation of ring-saturated, side-chain-unsaturated hydroxy steroids which comprises reducing with nascent hydrogen a compound having the molecular structure,

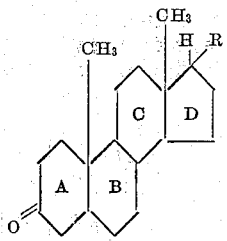

where R is a hydrocarbon side-chain containing at least one double bond, and the ring system contains a double bond in α, β position with respect to the ketone carbon atom.

9. Compounds having the formula,

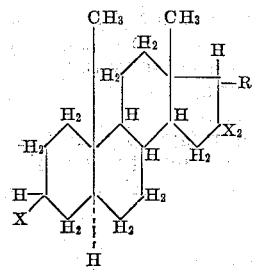

where R is an unsaturated hydrocarbon side-chain containing the same number of carbon atoms as are present in the naturally occurring sterols and X is a member of the class hydroxyl and groups capable upon hydrolysis of being converted to hydroxyl.

10. Compounds having the formula,

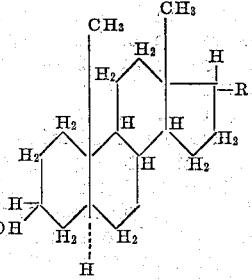

where R is an unsaturated hydrocarbon side-chain containing the same number of carbon atoms as are present in the naturally occurring sterols.

RUSSELL EARL MARKER.